US009058501B2

(12) United States Patent
Lehikoinen et al.

(10) Patent No.: US 9,058,501 B2
(45) Date of Patent: *Jun. 16, 2015

(54) METHOD, APPARATUS, AND COMPUTER PROGRAM PRODUCT FOR DETERMINING MEDIA ITEM PRIVACY SETTINGS

(71) Applicant: Core Wireless Licensing S.a.r.l., Luxembourg (LU)

(72) Inventors: Jaakko Lehikoinen, Hameenkyro (FI); Petri Piippo, Lempaala (FI); Juha Arrasvuori, Tampere (FI); Severi Uusitalo, Hameenlinna (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 83 days.

This patent is subject to a terminal disclaimer.

(21) Appl. No.: 13/644,250

(22) Filed: Oct. 3, 2012

(65) Prior Publication Data

US 2013/0097716 A1 Apr. 18, 2013

Related U.S. Application Data

(63) Continuation of application No. 12/272,963, filed on Nov. 18, 2008, now Pat. No. 8,301,659.

(51) Int. Cl.
*G06F 17/30* (2006.01)
*G06F 21/62* (2013.01)

(52) U.S. Cl.
CPC ............ *G06F 21/62* (2013.01); *G06F 21/6218* (2013.01); *G06F 2221/2111* (2013.01)

(58) Field of Classification Search
CPC ..................... G06F 17/30047; G06F 17/30017
USPC .......................................................... 707/783
See application file for complete search history.

(56) References Cited

U.S. PATENT DOCUMENTS

2003/0004916 A1* 1/2003 Lewis ............................... 707/1
2003/0161499 A1 8/2003 Svendsen et al.
(Continued)

FOREIGN PATENT DOCUMENTS

WO 2007/015184 A1 2/2007

OTHER PUBLICATIONS

Shane et al., "Over-Exposed48 Privacy Patterns and Considerations in Online and Mobile Photo Sharing," CHI 2007, Apr. 28-May 3, 2007, San Jose, California, USA, pp. 1-10; 10 pages in total.
(Continued)

*Primary Examiner* — Etienne Leroux
*Assistant Examiner* — Cindy Nguyen
(74) *Attorney, Agent, or Firm* — Winstead PC

(57) ABSTRACT

An apparatus for determining media item privacy settings may include a processor. The processor may be configured to receive media item capture data associated with a media item. The media item capture data may include at least a capture location. The processor may also be configured to identify a privacy context that corresponds to the media item capture data. In this regard, the capture location of the media item capture data may be within a geographic zone of the privacy context. The processor may be further configured to determine a privacy setting for the media item based on the corresponding privacy context, and, in some embodiments, control access to the media item in accordance with the determined privacy setting. Associated methods and computer program products may also be provided.

20 Claims, 7 Drawing Sheets

(56) References Cited

U.S. PATENT DOCUMENTS

| | | |
|---|---|---|
| 2003/0226038 A1 | 12/2003 | Raanan et al. |
| 2004/0070678 A1 | 4/2004 | Toyama et al. |
| 2004/0268251 A1 | 12/2004 | Sadovsky et al. |
| 2006/0107297 A1* | 5/2006 | Toyama et al. ............... 725/105 |
| 2006/0206911 A1* | 9/2006 | Kim et al. ...................... 725/12 |
| 2008/0046976 A1* | 2/2008 | Zuckerberg ....................... 726/4 |
| 2008/0198159 A1 | 8/2008 | Liu et al. |
| 2008/0215509 A1 | 9/2008 | Charlton |
| 2008/0294018 A1* | 11/2008 | Kurtz et al. .................. 600/301 |
| 2008/0297586 A1 | 12/2008 | Kurtz et al. |
| 2009/0077129 A1 | 3/2009 | Blose |
| 2009/0193055 A1* | 7/2009 | Kuberka et al. ............ 707/104.1 |
| 2009/0217344 A1* | 8/2009 | Bellwood et al. ................. 726/1 |

OTHER PUBLICATIONS

Moncrieff et al., "Dynamic Privacy in a Smart House Environment," In: Proceedings of the III International Conference on Multimedia and Expo, 2007, pp. 2034-2037; Jul. 2-5, 2007, 4 pages in total.

* cited by examiner

METHOD, APPARATUS, AND COMPUTER PROGRAM PRODUCT FOR DETERMINING MEDIA ITEM PRIVACY SETTINGS

TECHNICAL FIELD

Embodiments of the present invention relate generally to information sharing, and, more particularly, relate to a method, apparatus, and a computer program product for sharing media items based on privacy settings.

BACKGROUND

The modern communications era has brought about a tremendous expansion of wireline and wireless networks. Various types of networking technologies have been developed resulting in unprecedented expansion of computer networks, television networks, telephony networks, and the like, fueled by consumer demand. Wireless and mobile networking technologies have addressed related consumer demands, while providing more flexibility and immediacy of information transfer.

Current and future networking technologies continue to facilitate ease of information transfer and convenience to users by expanding the capabilities of mobile electronic devices and other computing devices. However, as the ease of information transfer increases, users continue to demand more and different types of data. Mobile devices, networks, personal computers, and other computing devices can now be used to share an assortment of information including, for example, media items, such as photos.

Various services (e.g., online services) for sharing information have been developed. These services often allow users to view or otherwise interact with the information shared by other users of the service. For example, a user of the service may capture digital photos using a digital camera, and upload the photos to a service to be shared. The uploaded photos may be viewable by other users of the service.

In some instances, since users of the service can view information provided by other users, privacy concerns may develop. As a result of these privacy concerns, users of the services may be hesitant or even refuse to share content on the service for fear of disclosing personal or otherwise sensitive information. While some services may provide various privacy mechanisms, difficulty or inconvenience in using many of these mechanisms may also have an adverse effect on information sharing and as result users may again be hesitant or refuse to share information.

BRIEF SUMMARY

A method, apparatus, and computer program product are described that determine media item privacy settings. In this regard, media item capture data may be obtained when a media item is captured, for example, by a digital camera, and privacy settings may be determined based on the media item capture data. In this regard, a user that is operating a device to capture a media item need not interact with the media item to define a privacy setting. Rather, the privacy setting may be automatically determined based on media item capture data and predefined privacy contexts. As such, a user need not have privacy concerns while media items are being captured and uploaded to the service, and the user may continue to capture media items in a continuous and convenient manner.

The media item capture data associated with a media item may include at least a capture location and a capture setting. The capture location may be the geographic location of the digital camera when the media item as captured. Further, the capture setting may be a setting of the digital camera, such as, for example, focal length, zoom level, etc. The media item capture data may be compared with predefined privacy contexts to identify a corresponding privacy context. A privacy context may describe a geographic zone and/or capture setting criteria. If the media item capture data describes a capture location that is within the geographic zone and the capture setting satisfies the capture setting criteria, then a corresponding privacy context may be identified. A privacy context may also be associated with a privacy setting and upon identifying a corresponding privacy context, the respective privacy setting may be assigned to the media item. The privacy setting may indicate a privacy level or group, and may be used to restrict access to the media item when the media item is shared on a service. In this manner, users that meet qualifications associated with the privacy setting (e.g., a member of a privacy group) may view or otherwise interact with the media item, but users that do not meet the qualifications may not interact with the media item.

In one exemplary embodiment, a method for determining media item privacy settings is described. The method may include receiving media item capture data. The media item capture data may include at least a capture location. The method may also include identifying a privacy context that corresponds to the media item, capture data. In this regard, the capture location of the media item capture data may be within a geographic zone of the privacy context. Further, the method may include determining a privacy setting for the media item based on the corresponding privacy context.

In another exemplary embodiment, an apparatus for determining media item privacy settings is described. The apparatus may include a processor. The processor may be configured to receive media item capture data. The media item capture data may include at least a capture location. The processor may also be configured to identify a privacy context that corresponds to the media item capture data. In this regard, the capture location of the media item capture data may be within a geographic zone of the privacy context. Further, the processor may be configured to determine a privacy setting for the media item based on the corresponding privacy context.

In another exemplary embodiment, a computer program product for determining media item privacy settings is described. The computer program product may include at least one computer-readable storage medium having computer-readable program code instructions stored therein. The computer-readable program code instructions may be configured to receive media item capture data. The media item capture data may include at least a capture location. The computer-readable program code instructions may also be configured to identify a privacy context that corresponds to the media item capture data. In this regard, the capture location of the media item capture data may be within a geographic zone of the privacy context. Further, the computer-readable program code instructions may be configured to determine a privacy setting for the media item based on the corresponding privacy context.

In yet another exemplary embodiment, an apparatus for determining media item privacy settings is described. The apparatus may include means for receiving media item capture data. The media item capture data may include at least a capture location. The apparatus may also include means for identifying a privacy context that corresponds to the media item capture data. In this regard, the capture location of the media item capture data may be within a geographic zone of the privacy context. Further, the apparatus may include means for determining a privacy setting for the media item based on the corresponding privacy context.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
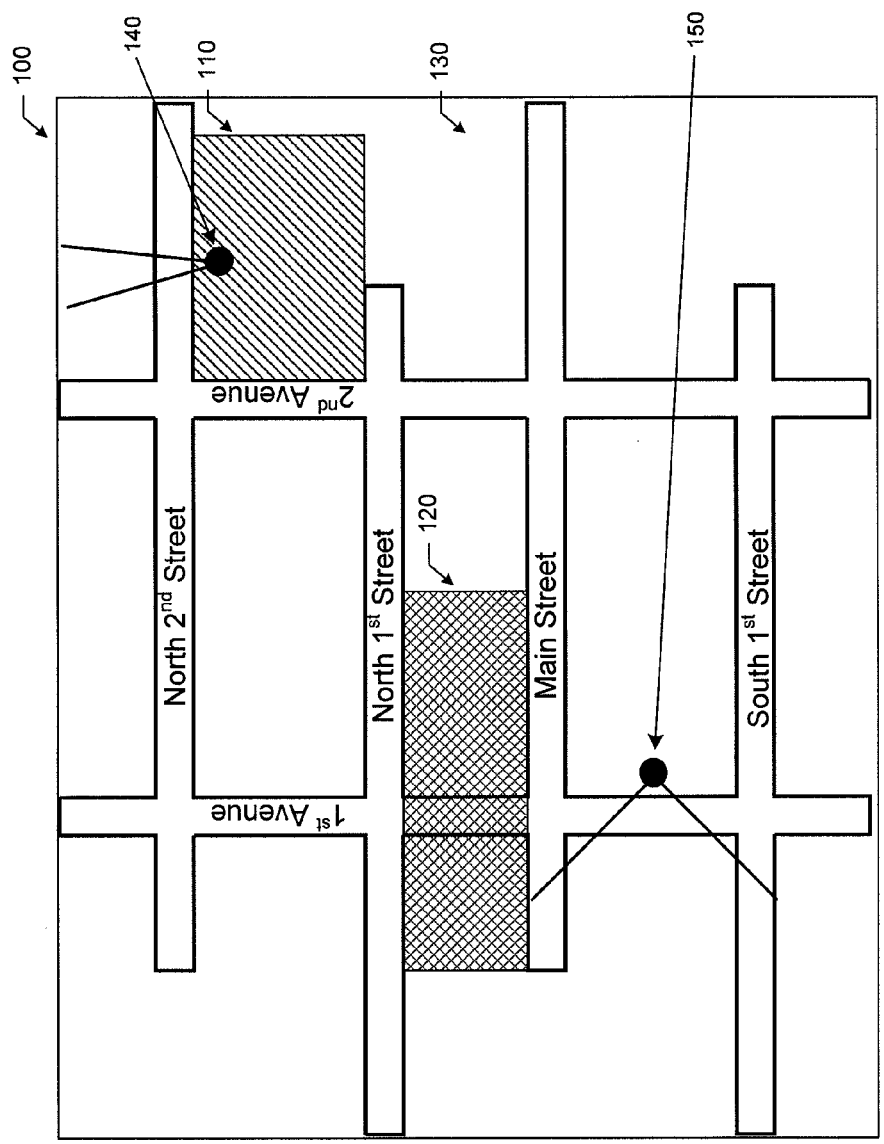
FIG. 1 is an illustration of defined geographic zones and direction criteria range that may be included in one or more privacy contexts according to various exemplary embodiments of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received, operated on, and/or stored in accordance with embodiments of the present invention. Moreover, the term "exemplary," as used herein, is not provided to convey any qualitative assessment, but instead to merely convey an illustration of an example.

Exemplary embodiments of the present invention may involve sharing media items on a service, such as an online service, with other users of the service. A media item may be a photo, a video, an audio file or the like. Users of the service may upload media items to a service (e.g., a web server) to share the media items. In some exemplary embodiments, the media items may include or be associated with a privacy setting and may be uploaded automatically, or with user permission, by the media capturing device after the media item is captured. For example, a mobile terminal configured to capture photos, may allow a user to capture a photo and then automatically, or with the user's permission, upload the photo to a service. Upon upload of a media item, other users of the service may access the media item (e.g., view or otherwise interact with the media item). However, according to various exemplary embodiments of the present invention, access to the uploaded media items may be restricted or granted based on a privacy setting.

The media items may be uploaded with the privacy setting, which may be a metadata item or tag of the media item. In embodiments where the media item is uploaded with the privacy setting, the privacy setting may be determined on the device configured to capture the media item (e.g., a digital camera, a mobile terminal including a digital camera, or the like) or on another device that is configured to upload the media items to the service (e.g., a computer). In some exemplary embodiments, media items may be uploaded with media item capture data, and the privacy setting for the media item may be determined at the service. The service may receive the media item and control (e.g., restrict or grant) access to the media item based on the privacy setting.

The privacy setting may indicate, for example, a privacy level and access to the media item may be restricted or granted based on the privacy level. Further, in some exemplary embodiments, the privacy setting may indicate or be associated with a predefined group of users of the service (e.g., family, friends, co-workers, etc.). The groups of users may be defined by a user, or profile information associated with users of the service may be used to define the group. The privacy setting may be configured to control access to members of the group or groups.

To determine a privacy setting for a media item, a comparison of media item capture data with one or more privacy contexts may be performed. In this regard, a privacy context may include a collection of criteria. If the media item capture data satisfies the criteria associated with a privacy context, then the privacy setting associated with the privacy context may be assigned to the media item. For example, a given privacy context may be associated with a "family only" privacy setting. If media item capture data of a given media item satisfies the criteria of the given privacy context, the given media item may be associated with or assigned a privacy setting of "family only." Other examples of privacy settings may include "visible to friends" or "public."

Media item capture data may be a collection of data associated with the capturing of a media item. The media item capture data may include a capture location (e.g., longitude and latitude, altitude, or the like) or a capture direction (e.g., bearing, heading, pitch, yaw, or the like). The media item capture data may also include values for camera-type settings or capture settings used to capture a media item. The camera-type or capture settings may include, for example, focal length, zoom level, lens type, aperture, shutter timing, white balance, color, style (e.g., black and white, sepia, or the like), picture quality (e.g., pixel count), flash, red-eye correction, date, time, or the like. In exemplary embodiments where the media item is a video, media item capture data may be obtained for each frame, or at some other interval in association with the video. In this regard, each frame or interval may be treated as a separate media item in accordance with various embodiments of the present invention.

As indicated above, a privacy context may include a collection of criteria. In some exemplary embodiments, the criteria may be defined by a user. Ranges or values for various criteria may be defined that correspond to data values that may be included in media item capture data. For example, one or more geographic zones may be defined as part of a privacy context. The geographic zones may be geographic areas defined based on for example, longitude and latitude coordinates or global positioning system (GPS) coordinates. In this regard, if media item capture data describes a location within a geographic area of a privacy context, then the geographic zone criteria may be satisfied.

Additionally, a capture direction range may be defined. In this regard, a capture direction range may be defined by a range between a first bearing and a second bearing. Further, the capture direction range may be defined with respect to a particular location. In this regard, media item capture data that describes a media capture event at a particular location and directed to a bearing between the first bearing and the second bearing may satisfy the criterion. In some exemplary embodiments, a previously captured media item and associated media item capture data may be used to define a capture direction range. In this regard, the capture direction of the previous captured media item, and some offset on either side of the bearing, may used to define a capture direction range for a privacy context.

Additionally or alternatively, in some exemplary embodiments, capture setting criteria may be defined in association with a privacy context. For example, the capture setting criteria may include a value or range for focal length range, zoom level range, shutter timer range, flash setting, or one or more other criteria directed to capture setting values that may be included in media item capture data.

In some exemplary embodiments, a combination of criteria may be associated with a privacy context. For example, a privacy context may include a geographic zone and a capture setting criterion of a range for the focal length. In other words, in the form of an example, a privacy context may include a geographic zone that may be an area that describes a family's back yard, and a focal length of ten to fifteen feet, which may be a typical focal distance used for family photos. As such, a photo taken in the family's backyard at a focal distance of twelve feet would satisfy the criteria of the example privacy context. Since the criteria have been satisfied in this example, the photo may be associated with a privacy setting of the privacy context (e.g., a "family only" privacy setting).

FIG. 1 illustrates a visual representation of privacy context criteria in a map interface 100 that may be used to facilitate defining the criteria of a privacy context. The map interface 100 may be generated on a display of a user interface, such as the display of the user interface 325 of FIG. 3. In some exemplary embodiments, the display of the user interface may be a touch screen display, and the privacy context criteria may be defined using the functionality of the touch screen display. The map interface 100 includes a definition of geographic zones 110 and 120, which may be associated with one or more privacy contexts. Further, the map interface 100 may also define a geographic zone 130 that includes the area not included in the geographic zones 110 and 120.

The map interface 100 also includes definitions for capture direction ranges 140 and 150. As indicated in the map interface 100, capture direction range 140 describes a narrower range than capture direction range 150. The capture direction range 140 is located within the geographic zone 110, and therefore the capture direction range 140 and the geographic zone 110 may be associated with the same privacy context.

The criteria for a privacy context may be defined on a client device configured to capture media items, such as, a digital camera, a mobile terminal with a media item capture module, or the like. Upon defining a privacy context, the privacy context may remain stored on the client device configured to capture media items to allow for determining of privacy settings on the client device prior to upload of a media item to a service. In other exemplary embodiments, privacy contexts may be uploaded to a service and determination of the privacy setting for a media item may take place at the service after the media item is uploaded. In yet another exemplary embodiment, privacy contexts may be defined and/or stored on a device that receives the media items prior to upload to the service (e.g., a computer configured to receive a memory card including media items and media item capture data). In this regard, determination of the privacy settings based on the privacy contexts may occur on the receiving device, and the receiving device may upload the media items with privacy settings to the service.

The ability to control access to a media item based on a privacy setting as described above may be useful in a number of settings. For example, access to personal or family photos may be managed through the privacy setting. Further, a user may subscribe to a travel service that has defined privacy contexts at popular locations where photographs are taken. For example, a privacy context associated with at least a location and bearing where photos of the Eiffel Tower are commonly taken may be defined, and the privacy context may be associated with a public privacy setting or setting specific to the travel service. In this manner, users of the travel service may publicly share a photo taken in accordance the privacy context. Use of the privacy contexts in this manner may also allow a travel agency to generate virtual tours where privacy contexts are defined at locations where the travel agency desires photos of customers enjoying a vacation. Further, the virtual tours may include shared photos from different times of the year or under varying conditions, and this may allow the tours to be directed to, for example, a location at summer dawn or at autumn sunset. Further, some exemplary embodiments of the present invention may be used to block, or at least make private, photos of particular location. In this regard, the sharing of a media item directed at government buildings, airports, corporate buildings, or the like may be managed.

Figure 2:
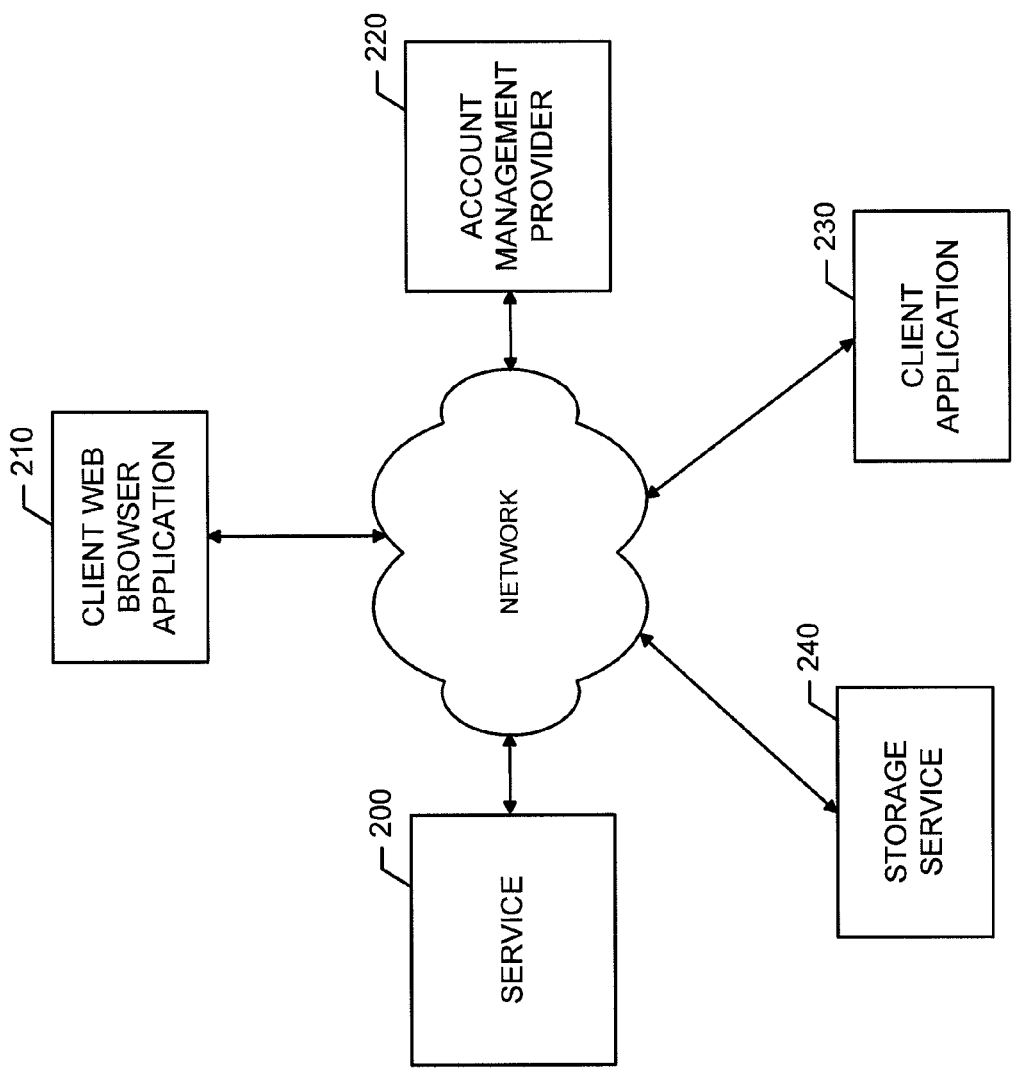
FIG. 2 illustrates an exemplary system of network entities that may facilitate sharing various information including media items with privacy settings according to exemplary embodiments of the present invention.

FIG. 2 illustrates a system including network entities that may facilitate determining media item privacy settings in accordance with various embodiments of the present invention. In some exemplary embodiments, a user may access or otherwise interact with data associated with a service 200 via a client web browser application 210 or a client application 230. In some exemplary embodiments, devices implementing the client web browser 210 and/or the client application 230 may be synchronized such that data available to the client web browser 210 is also available to the client application 230. Further, in some exemplary embodiments, devices may set synchronization parameters, which may identify types of content that should be synchronized (e.g., uploaded media items or privacy contexts) and types of content that need not be synchronized.

The system of FIG. 2 may include a service 200, a client web browser application 210, an account management provider 220, a client application 230, and a storage service 240. The service 200, the client web browser application 210, the account management provider 220, the client application 230, and the storage service 240 may be interconnected via the illustrated network which may be any type of, or combination of, wired and/or wireless networks.

The service 200, the account management provider 220, and the storage service 240 may collectively represent an exemplary embodiment of the apparatus 300 of FIG. 3 as described further below. In this regard, the service 200 may employ an internet or network service (e.g., a website, a social networking website, a blog website, a web feed, a widget, or the like) that may receive and interact with media items, privacy contexts, or other content. Various types of content, such as, but not limited to, media items, may be synchronized with and/or otherwise transferred to and from, the service 200. The service 200 may utilize the storage service 240 for storage and retrieval of content by the service 200. In various embodiments, the service 200 and/or storage service 240 may operate in the same manner as apparatus 300 and the memory device 310 of apparatus 300 as further described below.

Further, the account management provider 220 may operate together with the various other network entities to perform account management and security features. In some embodiments, login information and passwords are first directed to the account management provider 220 for verification. Upon verification, the account management provider 220 may provide access to, and allow communications between various network entities using, for example, a token or other access key.

Figure 3:
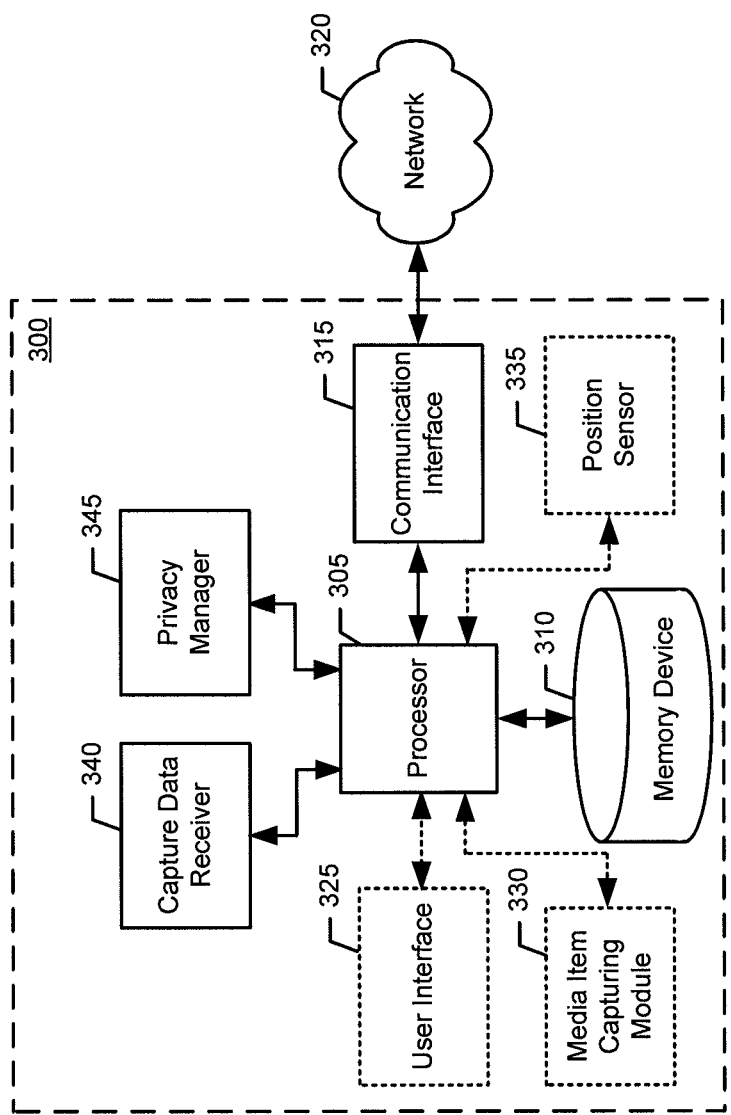
FIG. 3 is a schematic block diagram of an apparatus for determining media item privacy settings according to various exemplary embodiments of the present invention.

Client application 230 may be a software or hardware application residing and operating on a platform, such as the apparatus 300 of FIG. 3. The client application may be downloaded to and/or installed on the platform. In some embodiments, the client application 230 may be specifically tailored to interact with the service 200, that is, client application 230 may be a dedicated application. Via the client application 230, a platform may interact with the service 200 to send, receive, and/or modify, as well as synchronize, content, such as media items, between the client application 230 and the service 200. The client application 230 may facilitate the gathering and storage of content for subsequent transmission to the service 200.

Similar to the client application 230, the client web browser application 210 may be a software or hardware application residing and operating on a platform, such as the apparatus 300 of FIG. 3 that may be used to interact with the service 200. In this regard, the client web browser application 210 may be a generic network communication application for interacting with various network entities, including the service 200. Via the client web browser application 210, a platform, and the user of the platform, may interact with the service 200 to send, receive, and/or modify, as well as synchronize data between the client web browser application 210 and the service 200. The client web browser application 210 may facilitate the gathering and storage of media items including privacy settings and other data for subsequent transmission to the service 200.

FIG. 3 illustrates an exemplary apparatus 300 that may provide for determining media item privacy settings. In some exemplary embodiments, the apparatus 300 may be embodied as, or included as a component of, a communications device with wired or wireless communications capabilities. Some examples of the apparatus 300 may include a computer, a server, a mobile terminal such as, a mobile telephone, a portable digital assistant (MA), a pager, a mobile television, a gaming device, a mobile computer, a laptop computer, a camera, a video recorder, an audio/video player, a radio, and/or a global positioning system (GPS) device, a network entity such as an access point such as a base station, or any combination of the aforementioned, or the like. Further, the apparatus 300 may be configured to implement various aspects of the present invention as described herein including, for example, various exemplary methods of the present invention, where the methods may be implemented by means of a hardware or software configured processor, computer-readable medium, or the like.

As described above, the determination of a privacy setting for a media item may occur on a number of devices depending upon how a system is configured and where the privacy contexts are stored. For example, the privacy setting may be determined on the device that captures the media item (e.g., the digital camera), on a server associated with a service that may receive an uploaded media item, or on another computing device that may receive a media item prior to uploading the media item to a service. Since apparatus 300 may be configured to determine a privacy setting for a media item, apparatus 300 be configured to operate within the role of any of these devices.

The apparatus 300 may include or otherwise be in communication with a processor 305, a memory device 310, and a communications interface 315. In some embodiments, such as embodiments where the apparatus 300 is a mobile terminal, the apparatus 300 may also include a user interface 325, a media item capturing module 330, and a position sensor 335. The processor 305 may be embodied as various means including, for example, a microprocessor, a coprocessor, a controller, or various other processing devices including integrated circuits such as, for example, an ASIC (application specific integrated circuit), an FPGA (field programmable gate array), or a hardware accelerator. In an exemplary embodiment, the processor 305 may be configured to execute instructions stored in the memory device 310 or instructions otherwise accessible to the processor 305. Processor 305 may also be configured to facilitate communications via the communications interface by for example, controlling hardware and/or software included in the communications interface.

The memory device 310 may be a computer-readable storage medium that may include volatile and/or non-volatile memory. For example, memory device 310 may include Random Access Memory (RAM) including dynamic and/or static RAM, on-chip or off-chip cache memory, and/or the like. Further, memory device 310 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 310 may include a cache area for temporary storage of data. In this regard, some or all of memory device 310 may be included within the processor 305.

Further, the memory device 310 may be configured to store information, data, applications, computer-readable program code instructions, or the like for enabling the processor 305 and the apparatus 300 to carry out various functions in accordance with exemplary embodiments of the present invention. For example, the memory device 310 could be configured to buffer input data for processing by the processor 305. Additionally, or alternatively, the memory device 310 may be configured to store instructions for execution by the processor 305.

The user interface 325 may be in communication with the processor 305 to receive user input at the user interface 325 (e.g., privacy context criteria) and/or to provide output to a user as, for example, audible, visual, mechanical or other output indications. The user interface 325 may include, for example, a keyboard, a mouse, a joystick, a display (e.g., a touch screen display), a microphone, a speaker, or other input/output mechanisms. In some exemplary embodiments, such as when apparatus 300 is implemented as a server for a service (e.g., service 300) the user interface 325 may be limited, or even eliminated.

In some embodiments, the apparatus 300 may include a media item capturing module 330, such as a camera, video and/or audio module, in communication with the processor 305. The media item capturing module 330 may be any means for capturing images, video and/or audio for storage, display, or transmission. For example, in an exemplary embodiment in which the media item capturing module 330 is a camera, the camera may be configured to form and save a digital image file from an image captured by the camera. The media item capturing module 330 may be configured to capture media items in accordance with a number of capture settings. The capture settings may include, for example, focal length, zoom level, lens type, aperture, shutter timing, white balance, color, style (e.g., black and white, sepia, or the like), picture quality (e.g., pixel count), flash, red-eye correction, date, time, or the like. In some embodiments, the values of the capture settings (e.g., degree of zoom) may be obtained at the time a media item is captured and stored in association with the captured media item in a memory device, such as, memory device 310.

The media item capturing module 330 can include all hardware, such as a lens or other optical component(s), and software necessary for creating a digital image file from a captured image. The media item capturing module 330 may also include all hardware, such as a lens or other optical component(s), and software necessary to provide various media item capturing functionality, such as for example, image zooming functionality. Image zooming functionality can include the ability to magnify or de-magnify an image prior to or subsequent to capturing an image.

Alternatively, the media item capturing module 330 may include only the hardware needed to view an image, while a memory device, such as the memory device 330 of the apparatus 300 stores instructions for execution by the processor 305 in the form of software necessary to create a digital image file from a captured image. In an exemplary embodiment, the media item capturing module 330 may further include a processor or co-processor which assists the processor 305 in processing image data and an encoder and/or decoder for compressing and/or decompressing image data. The encoder and/or decoder may encode and/or decode according to, for example, a joint photographic experts group (JPEG) standard or other format.

The apparatus 300 may further include a position sensor 335 such as, for example, a global positioning system (GPS) module in communication with the processor 305. The position sensor 335 may be any means including any device or circuitry for determining the location and in some embodiments, the orientation (e.g., bearing, pitch, yaw, etc.) of apparatus 300. The orientation may be determined through the implementation of accelerometers, gyroscopes, electronic compasses, magnetometers, and the like. The position sensor 335 may include all hardware for identifying the location and, in some exemplary embodiments, the orientation of the apparatus 300. Alternatively or additionally, the position sensor 335 may utilize a memory device, such as memory device 310 to store instructions for execution by the processor 305 in the form of software necessary to determine the location and, in some embodiments, the orientation of the apparatus 300. In some exemplary embodiments, the position sensor 335 may include or otherwise alternatively be embodied as, for example, an assisted global positioning system (Assisted-GPS) sensor, or a location client, which may be in communication with a network device to receive and/or transmit information, such as a sky or floor sensor, for use in determining a location of the apparatus 300. In this regard, the location of the apparatus 300 may be determined by GPS, as described above, cell ID, signal triangulation, or other mechanisms as well. In one exemplary embodiment, the position sensor 335 includes a pedometer or inertial sensor. The position sensor 335 may be capable of determining a location of the apparatus 300, with respect to, for example, longitude, latitude and altitude of the apparatus 300, or a location relative to a reference point such as a destination or start point. Information from the position sensor 335 (e.g., location information and/or orientation information) may be communicated to memory device 310 or to another memory device to be stored, for example, as media item capture data. Additionally, the position sensor 335 may be capable of utilizing the processor 305 to transmit/receive, via communication interface 315, location and/or orientation information such as the current location/orientation of the apparatus 300.

The capture data receiver 340 and the privacy manager 345 of apparatus 300 may be any means or device embodied in hardware, software, or a combination of hardware and software, such as processor 305 implementing software instructions or a hardware configured processor 305, that is configured to carry out the functions of capture data receiver 340 and/or privacy manager 345 as described herein. In an exemplary embodiment, the processor 305 may include, or otherwise control the capture data receiver 340 and/or the privacy manager 345. In various exemplary embodiments, the capture data receiver 340 and/or the privacy manager 345 may reside on differing apparatuses such that some or all of the functionality of the capture data receiver 340 and/or the privacy manager 345 may be performed by a first apparatus, and the remainder of the functionality of the capture data receiver 340 and/or the privacy manager 345 may be performed by one or more other apparatuses.

The capture data receiver 340 may be configured to receive media item capture data associated with a media item. In some exemplary embodiments, the capture data receiver 340 may receive media item capture data from the media item capturing module 330, the memory device 310, or via the communication interface 315. The media item capture data may include at least a capture location and a capture setting. In some exemplary embodiments, a capture direction may also be included in the media item capture data. Further, in some exemplary embodiments, the capture setting or settings included in the media item capture data may be a focal length, zoom level, lens type, aperture, shutter timing, white balance, color, style (e.g., black and white, sepia, or the like), picture quality (e.g., pixel count), flash, red-eye correction, date, time, or the like.

The privacy manager 345 may be configured to identify a privacy context. The identified privacy context may correspond to the received media item capture data. Candidate privacy contexts may be stored in, and retrieved from, the memory device 310 to perform analyses of the privacy contexts with respect to the received media item capture data. The received media item capture data may be analyzed with respect to one or more privacy contexts to determine whether the media item capture data satisfies the criteria of a privacy context. In this regard, the media item capture data may be applied to the respective criteria of each privacy context. In particular, if the capture location of the media item capture data is within a geographic zone of a privacy context then the geographic zone criteria may be satisfied. Further, if the capture setting of the media item capture data falls with a range of, or is equivalent to, a capture setting criteria of the privacy context, then the capture setting criteria may be satisfied. In some exemplary embodiments, if the capture direction of the media item capture data falls within a range defined by capture direction range or criteria of a privacy context, then the capture direction criteria may be satisfied. If the media item capture data satisfies the criteria of a privacy context, then a corresponding privacy context may be identified.

Further, the privacy manager 345 may be configured to determine a privacy setting. The privacy setting may be determined based upon the corresponding privacy context. Since each privacy context may be associated with a respective privacy setting, once a corresponding privacy context is identified, an associated privacy setting may be determined via the association.

The privacy manager 345 may also be configured to control access to a media item based on the determined privacy setting. For example, in exemplary embodiments where apparatus 300 is included in a server of a service, the privacy manager 345 may grant or restrict access by users of the service based on the privacy setting associated with the media item. Access may be restricted or granted to a predefined user group indicated by the privacy setting. In some exemplary embodiments, the privacy manager 345 may be configured to direct a service to control access to the media item in accordance with the privacy setting. For example, a mobile terminal with a media item capturing module may direct a service, or a server of the service, to control access to the media item by uploading the media item to the service with an associated privacy setting.

In some exemplary embodiments, the privacy manager 345 may be configured to generate a privacy metadata item comprising the privacy setting and assign the privacy metadata item to the media item. The privacy manager 345 may also be configured to direct a service to control access to the media item in accordance with the privacy metadata item. Further, in some exemplary embodiments, the privacy manager 345 may be configured to automatically upload the media item and privacy metadata item to the service.

FIGS. 4, 5, 6 and 7 illustrate a flowchart of a system, method, and computer program product according to exemplary embodiments of the invention. It will be understood that each block, step, or operation of the flowchart, and/or combinations of blocks, steps, or operations in the flowchart, can be implemented by various means. Means for implementing the blocks, steps, or operations of the flowchart, and/or combinations of the blocks, steps or operations in the flowchart may include hardware, firmware, and/or software including one or more computer program code instructions, program instructions, or executable computer-readable program code instructions. In one exemplary embodiment, one or more of the procedures described herein may be embodied by program code instructions. In this regard, the program code, instructions which embody the procedures described herein may be stored by or on a memory device, such as memory device 310, of an apparatus, such as apparatus 300, and executed by a processor, such as the processor 305. As will be appreciated, any such program code instructions may be loaded onto a computer or other programmable apparatus (e.g., processor 305, memory device 310) to produce a machine, such that the instructions which execute on the computer or other programmable apparatus create means for implementing the functions specified in the flowchart's block(s), step(s), or operation(s). These program code instructions may also be stored in a computer-readable storage medium that can direct a computer, a processor, or other programmable apparatus to function in a particular manner, such that the instructions stored in the computer-readable storage medium produce an article of manufacture including instruction means which implement the function specified, in the flowchart's block(s), step(s), or operation(s). The program code instructions may also be loaded onto a computer, processor, or other programmable apparatus to cause a series of operational steps to be performed on or by the computer, processor, or other programmable apparatus to produce a computer-implemented process such that the instructions which execute on the computer, processor, or other programmable apparatus provide steps for implementing the functions specified in the flowchart's block(s), step(s), or operation(s).

Accordingly, blocks, steps, or operations of the flowchart support combinations of means for performing the specified functions, combinations of steps for performing the specified functions, and program code instruction means for performing the specified functions, it will also be understood that one or more blocks, steps, or operations of the flowchart, and combinations of blocks, steps, or operations in the flowchart, can be implemented by special purpose hardware-based computer systems which perform the specified functions or steps, or combinations of special purpose hardware and program code instructions.

Figure 4:
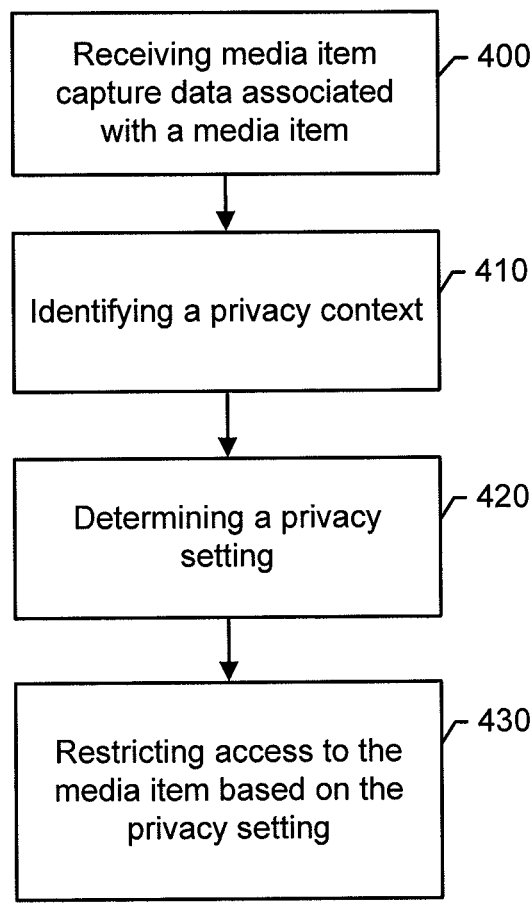
FIG. 4 is a flowchart of a method for determining media item privacy settings according to various exemplary embodiments of the present invention.

FIG. 4 depicts a flowchart describing an exemplary method of the present invention. The exemplary method may include receiving media item capture data associated with a media item at 400. In this regard, the media item capture data may include at least a capture location and a capture setting. In some exemplary embodiments, a capture direction may also be included in the media item capture data. Further, in some exemplary embodiments, the capture setting included in the media item capture data may be a focal length, zoom level, lens type, aperture, shutter timing, white balance, color, style (e.g., black and white, sepia, or the like), picture quality (e.g., pixel count), flash, redeye correction, date, time, or the like.

At 410, the method may include identifying a privacy context. The identified privacy context may correspond to the media item capture data. In particular, the capture location of the media item capture data may be within a geographic zone of the privacy context and the capture setting of the media item capture data may satisfy capture setting criteria of the privacy context. In some exemplary embodiments, a capture direction of the media item capture data may satisfy capture direction criteria of the identified privacy context.

Further, at 420, the method may include determining a privacy setting. The privacy setting may be determined based upon the corresponding privacy context. In this regard, the privacy setting may be associated with the privacy context.

At 430, the method may include controlling access to the media item based on the determined privacy setting. In some exemplary embodiments, controlling access may include directing a service to control access to the media item in accordance with the privacy setting, in some exemplary embodiments, controlling access may include generating a privacy metadata item comprising the privacy setting, assigning the privacy item to the media item, and/or directing a service to control access to the media item in accordance with the privacy metadata item. Further, in some exemplary embodiments, controlling access may further include automatically uploading the media item and privacy metadata item to the service. Controlling access may also include controlling access to a predefined user group indicated by the privacy setting.

Figure 5:
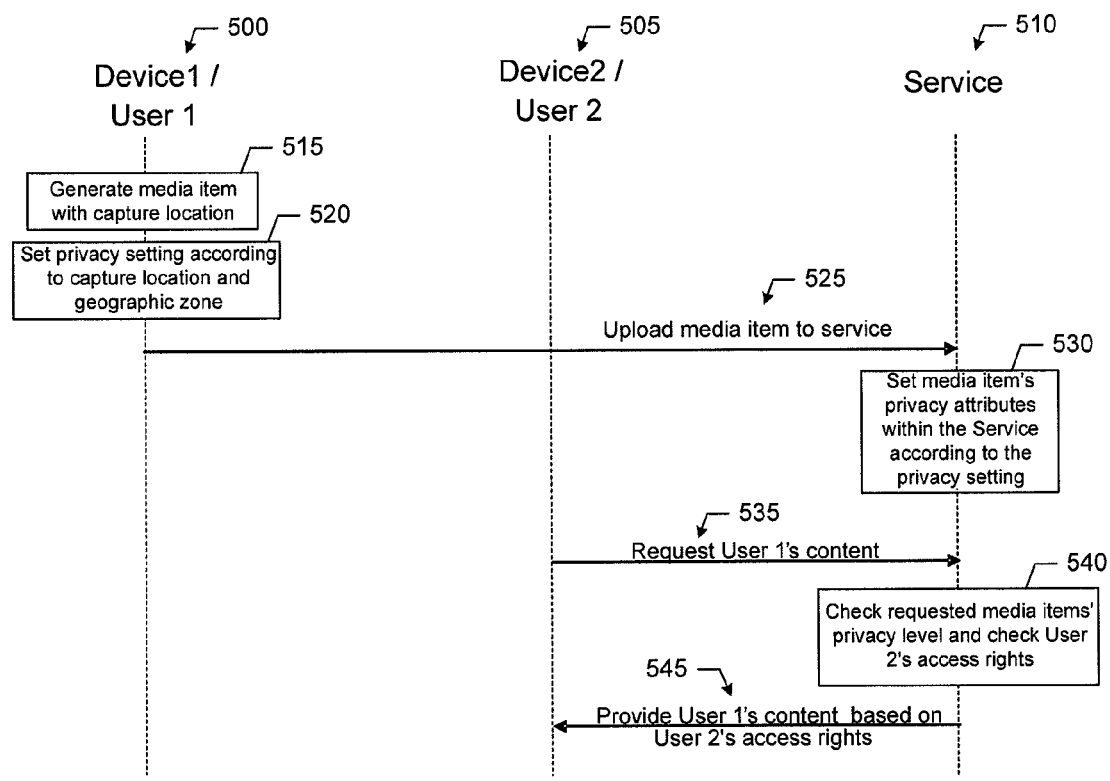
FIG. 5 is a signaling diagram describing a method for determining media item privacy settings in accordance with various exemplary embodiments of the present invention.

FIG. 5 illustrates a signaling diagram/flowchart describing a media item interaction sequence according to various embodiments of the present invention. The signaling diagram of FIG. 5 describes the interactions between a Device 1/User 1 500, a Device 2/User 2 505, and a Service 510. Device 1/User 1 500 and Device 2/User 2 505 may be devices configured in the same manner as apparatus 300. Further, the Service 510 may be configured in the same manner as the service 200.

At 515, Device 1/User 1 500 may capture or generate a media item with a capture location. At 520, a privacy setting may be assigned to the media item based on the capture location and the geographic zone. At 525, the media item may be uploaded to the Service 510. At 530, the service may set the media item's privacy attributes within the Service 510 based on the media item's privacy setting.

At 535, Device 2/User2 505 may request User 1's content from the Service 510, and in particular, Device 2/User2 505 may request the recently uploaded media item. At 540, Service 510 may check the media item's privacy attributes within the Service 510 and check User 2's access rights. At 545, Device 2/User 2 505 may be provided the media item based on User 2's access rights.

In another exemplary embodiment of the present invention, geographic zones may be defined in association with points of interest (POIs). In this regard, POIs may be associated with public locations that may be included on maps in for example, a mapping application. The POIs may provide criteria for defining a privacy setting of a media item. In this regard, if a media item is captured at a location which is defined by POI, or a predefined distance from that POI, the privacy setting of the media item captured at that location may be set to, for example, a public privacy setting. Further, in some exemplary embodiments, a POI may be associated with a dynamic privacy setting based on the events occurring at the POI. For example, a media item captured at a stadium when no event is taking place may be assigned a personal or family only privacy setting. However, a media item captured at the stadium during a public concert may be provided a public privacy setting.

Further, in some embodiments the type of establishment associated with a POI may designate the associated privacy setting for media items captured at the POI. For example, a restaurant POI may have a private or friends only privacy setting, since a restaurant may be considered a private or personal environment. However, a POI such as the Statue of Liberty may be associated with a low or public privacy setting, since it is a public place.

Additionally, attributes of the media items captured at these locations may also influence the privacy setting of a media item. For example, when a user captures an image close to the POI associated with the Statue of Liberty, embodiments of the present invention may automatically suggest or change to a privacy setting to a public privacy setting, and a captured image may made available to others in on a service.

Also, the geographic zone associated with the POI area may be defined with a circle around the POI or the geographic zone may be defined by another geometrical value. The geographic zone may be associated with a map in a mapping application, and the associated privacy setting may be stored as metadata with the map. In this regard, various embodiments of the present invention may also include an interface to communicate data between the POI on the map and the media item capturing application.

Figure 6:
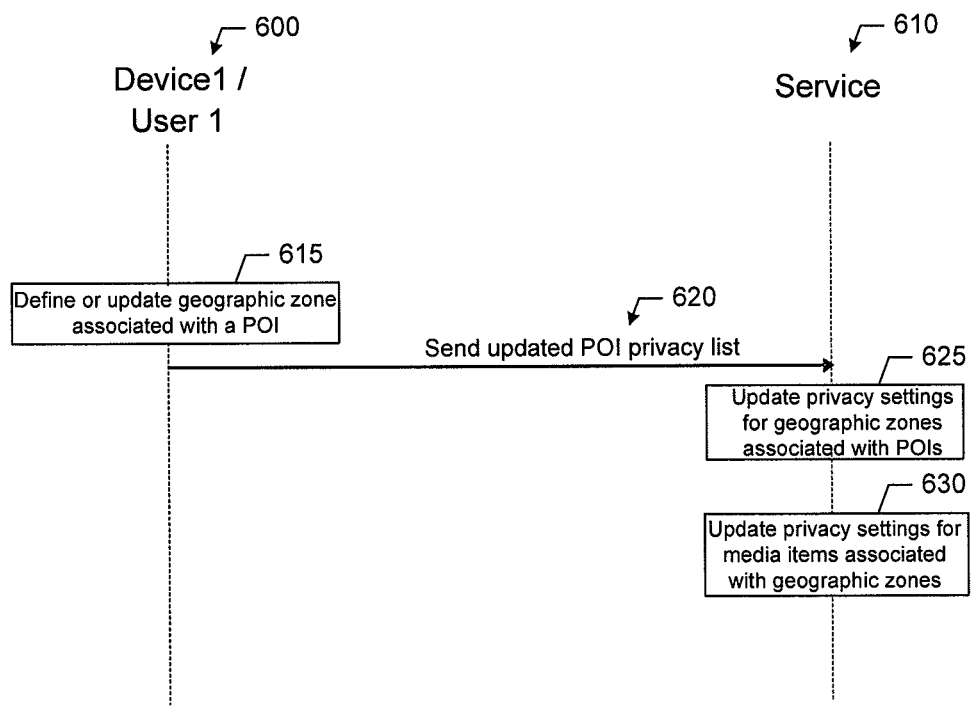
FIG. 6 is a signaling diagram describing a method of defining a point of interest area according to various exemplary embodiments of the present invention.
Figure 7:
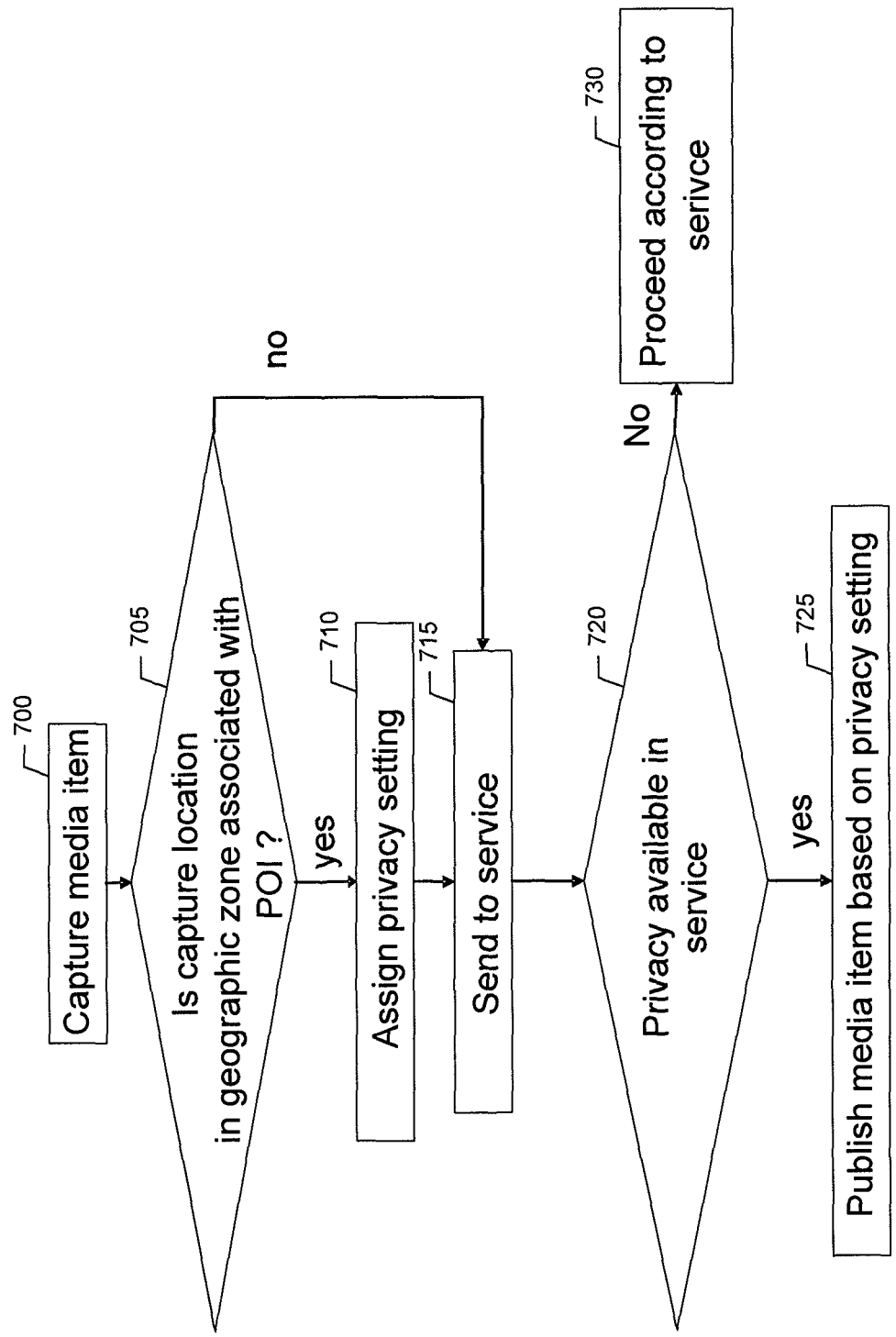
FIG. 7 is flowchart for a method of determining a privacy setting in association with a point of interest in accordance with various exemplary embodiments of the present invention.

FIGS. 6 and 7 illustrate methods associated with determining privacy settings that involve the use of POIs. In particular, FIG. 6 illustrates a method for defining and updating geographic zones associated with POIs. The interaction described with respect to FIG. 6 involves a Device User 1 600 and a Service 610. Device 1/User 1 600 may be a device configured in the same manner as apparatus 300. Further, the Service 610 may be configured in the same manner as the service 200.

At 615, the Device 1/User 1 600 may define or update a geographic zone associated with a POI. In some exemplary embodiments, defining or updating a geographic zone associated with a POI may be performed on a touch screen display using a mapping application. At 620, an updated POI privacy list may be communicated to the Service 610. The POI privacy list may comprise all or some of the defined POIs, associated geographic zones, and associated privacy settings. The Service 610 may update, within the service, the privacy settings associated with the geographic zones of the POIs at 625. At 630, the privacy settings for media items stored on the Service 610 may be updated n accordance with the geographic zones and associated privacy settings of the POIs.

FIG. 7 illustrates a method of capturing and uploading a media item to a service that utilizes PUS and associated geographic zones. In this regard, at 700, a media item may be captured. At 705, a determination may be made regarding whether the capture location of the media item is within a geographic zone associated with a POI. If the capture location is within the geographic zone of the POI, a privacy setting associated with the POI may be assigned to the media item at 710 and the media item may be sent to the service at 715. If the capture location is not within the geographic zone of the POI, a privacy setting need not be assigned to the media item, and the media item may be sent to the service at 715. In either case, a determination may be made as to whether the service supports privacy settings at 720. If the service does not support privacy settings, the media item may be handled in accordance with the rules of the service at 730. If the service does support privacy settings, the media item may be published based on the privacy setting at 725.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

The invention claimed is:

1. A method comprising:

storing, on a device, one or more predefined privacy contexts, each privacy context comprising a collection of criteria, the collection of criteria including at least one geographic zone criteria for a capture location, the capture location comprising a geographic location of a media capture apparatus;

determining, by the device, a privacy setting for a media item based on capture data of the media item and according to the one or more stored predefined privacy contexts, the capture data including at least the capture location; and sending, by the device, the media item with the determined privacy setting to a service, the privacy setting used to control access to the media item.

2. The method of claim 1, wherein determining the privacy setting includes: generating a privacy metadata item comprising the privacy setting; and assigning the privacy metadata item to the media item.

3. The method of claim 1 further comprising providing a user interface for setting the privacy context.

4. The method of claim 3, further comprising providing a map interface for setting the at least one geographic zone criteria.

5. The method of claim 1, wherein media capture apparatus is included in the device.

6. The method of claim 1, wherein the collection of criteria further includes at least one of a capture direction, a capture direction range, a capture setting, the capture setting comprising at least one of a focal length, a zoom level, a shutter timing, aperture, a white balance, a lens type, a picture quality, a date, and a time for capturing the media item.

7. The method of claim 4, further comprising defining at least one geographic zone that is associated with a point of interest.

8. An apparatus comprising:
a memory configured to store one or more predefined privacy contexts, each privacy context comprising a collection of criteria, the collection of criteria including at least one geographic zone criteria for a capture location, the capture location comprising a geographic location of a media capture apparatus; and
a processor configured to determine a privacy setting for a media item based on capture data of the media item and according to the one or more stored predefined privacy contexts, the capture data including at least the capture location, and send the media item with the determined privacy setting to a service, the privacy setting used to control access to the media item.

9. The apparatus of claim 8, wherein the processor is configured to generate a privacy metadata item comprising the privacy setting, and assign the privacy metadata item to the media item.

10. The apparatus of claim 8, further comprising a user interface configured to allow a user to set the privacy context.

11. The apparatus of claim 10, further comprising a display configured to provide a map interface for setting the at least one geographic zone criteria.

12. The apparatus of claim 8, further comprising the media capture apparatus.

13. The apparatus of claim 8, wherein the collection of criteria further includes at least one of a capture direction, a capture direction range, a capture setting, the capture setting comprising at least one of a focal length, a zoom level, a shutter timing, aperture, a white balance, a lens type, a picture quality, a date, and a time for capturing the media item.

14. The apparatus of claim 11, wherein the at least one geographic zone is associated with a point of interest.

15. A computer program product comprising at least one non-transitory computer-readable storage medium having executable computer-readable program code instructions stored therein, the computer-readable program code instructions configured, via a processor, to:
store one or more predefined privacy contexts to a memory, each privacy context comprising a collection of criteria, the collection of criteria including at least one geographic zone criteria for a capture location, the capture location comprising a geographic location of a media capture apparatus;
determine a privacy setting for a media item based on capture data of the media item and according to the one or more stored predefined privacy contexts, the capture data including at least the capture location; and
send the media item with the determined privacy setting to a service, the privacy setting used to control access to the media item.

16. The computer program product of claim 15, wherein the computer-readable program code instructions are further configured, via the processor, to: generate a privacy metadata item comprising the privacy setting; and assign the privacy metadata item to the media item.

17. The computer program product of claim 15, wherein the computer-readable program code instructions are further configured, via the processor, to provide a user interface for setting the privacy context.

18. The computer program product of claim 17, wherein the computer-readable program code instructions are further configured, via the processor, to provide a map interface for setting the at least one geographic zone criteria.

19. The computer program product of claim 15, wherein the collection of criteria further includes at least one of a capture direction, a capture direction range, a capture setting, the capture setting comprising at least one of a focal length, a zoom level, a shutter timing, aperture, a white balance, a lens type, a picture quality, a date, and a time for capturing the media item.

20. The computer program product of claim 18, wherein the computer-readable program code instructions are further configured, via the processor, to define at least one geographic zone that is associated with a point of interest.

\* \* \* \* \*